United States Patent [19]

Weiler

[11] Patent Number: 4,547,326
[45] Date of Patent: Oct. 15, 1985

[54] GAS LIQUID CONTACTING TRAY
[75] Inventor: David W. Weiler, Burt, N.Y.
[73] Assignee: Union Carbide Corporation, Danbury, Conn.
[21] Appl. No.: 682,185
[22] Filed: Dec. 17, 1984

Related U.S. Application Data
[63] Continuation of Ser. No. 238,803, Feb. 27, 1981.

[51] Int. Cl.⁴ .............................................. B01F 3/04
[52] U.S. Cl. ............................................... 261/114 R
[58] Field of Search ................................... 261/114 R

[56] References Cited

U.S. PATENT DOCUMENTS

| | | | |
|---|---|---|---|
| 960,223 | 5/1910 | Guillaume | 261/110 |
| 1,419,867 | 6/1922 | Laird | |
| 1,673,732 | 6/1928 | Brooks | 261/114 R |
| 2,510,590 | 6/1950 | Kraft | 261/114 R |
| 2,682,395 | 6/1954 | Claridge et al. | 261/114 R |
| 2,693,949 | 11/1954 | Huggins | 261/114 R |
| 2,757,915 | 8/1956 | Huggins | 261/114 R |
| 2,804,935 | 9/1957 | Hutchinson | 261/114 R |
| 2,926,754 | 3/1960 | Regatz | |
| 3,053,521 | 9/1962 | Plaster et al. | 261/114 R |
| 3,506,408 | 4/1970 | Kageyama et al. | 261/114 R |
| 3,729,179 | 4/1973 | Keller | 261/114 R |
| 3,779,525 | 12/1973 | Tanigawa et al. | 261/114 R |
| 4,051,206 | 9/1977 | Bunas et al. | 261/109 |

FOREIGN PATENT DOCUMENTS

| | | | |
|---|---|---|---|
| 764103 | 3/1953 | Fed. Rep. of Germany | 261/114 R |
| 901917 | 11/1944 | France | 261/114 R |

*Primary Examiner*—Tim Miles
*Attorney, Agent, or Firm*—A. H. Fritschler

[57] ABSTRACT

A gas-liquid contacting tray for use in a gas-liquid contacting tower is provided with a wall member at the discharge region of the tray wherein the wall member has one or more apertures for discharging a liquid flowing across the surface of the tray thereby providing for stable tray performance over a wide range of turndown.

19 Claims, 9 Drawing Figures

GAS LIQUID CONTACTING TRAY

This application is a continuation of prior U.S. application: Ser. No. 238,803 Filing Date Feb. 27, 1981.

This invention is directed to gas-liquid contacting trays for use in gas-liquid contacting distillation or fractionation towers. More particularly, this invention is directed to an improved gas-liquid contacting tray which permits stable tray performance over a wide range of turn-down.

BACKGROUND OF THE INVENTION

Gas-liquid contacting towers or columns referred to, for example, as fractionation, distillation or aborption towers are well known particularly in the petroleum and petrochemical industries.

Such towers or columns are designed to conduct liquids in a zig-zag course downwardly through the column while admitting gases upwardly into horizontal-flowing portions of the liquid for intimate contact with the liquid.

Trays for providing the horizontal flow of the liquid are well known in the art and have been widely used. Such trays generally comprise a perforate gas-liquid contacting member or members for effecting intimate contact between a rising gas and a liquid flowing on the surface of the tray across the perforate member. The perforate gas-liquid contacting member is in some instances provided with bubble caps or valves. Adjacent one edge of the contacting member of the tray is an imperforate liquid inlet area for receiving the liquid onto the tray. Adjacent an opposite edge of the contacting member is the liquid discharge end or region of the tray provided with an imperforate weir member extending vertically above the surface of the tray. The flowing liquid overflows the weir member for discharge from the tray. Accordingly, the imperforate weir member, which is often referred to in the art as an outlet weir, maintains a given liquid depth or froth height on the tray.

Those skilled in the art are well aware of the problems associated with designing a tray which will operate in a stable condition over a fairly broad turn-down ratio, that is at a reduced feed rate and therefore at reduced internal liquid and gas flow rates. Tray instability is evidenced by what is referred to as "weeping" and in the extreme as "dumping" which result in decreased tray efficiency, since the desired degree of intimate gas-liquid contacting does not occur due to a lack of liquid inventory on the tray. Weeping is the passage of some of the liquid through the perforations or gas passageways of the gas-liquid contacting member of the tray. Dumping is the condition in which substantially all of the liquid falls through the gas passageways of the gas-liquid contacting member rather than flowing across the tray.

Weeping and dumping are associated with reduced gas flow velocities at turn-down. When weeping or dumping occur, the gas that is prevented from passing through the gas passageways in those sections of the gas-liquid contacting member of the tray must pass through the gas passageways of other sections of the gas-liquid contacting member. This increases superficial gas velocities in these other sections and results in nonuniformity of gas-liquid contact which also adversely effects overall tray performance.

The prior art has employed various approaches to provide for stable tray operation over fairly broad conditions of turn-down.

One approach has been to design trays with excessive tray stabilities by providing a higher than necessary dry plate pressure drop at the design gas flow. Dry plate pressure drop may be simply defined as the pressure drop caused by gas flow through the gas passageways absent the effect of the supported liquid flowing across the tray. As is known in the art, tray stability may be mathematically expressed as being proportional to the ratio of dry plate pressure drop to the height of clear liquid flowing across the tray.

As a stable column is turned-down (i.e., as the liquid and gas flows through the column are reduced) the main resistance to liquid flow through the gas passageways (gas flow) is decreased. The magnitude of this resistance is proportional to and reflected by the magnitude of the dry plate pressure drop. The size of the gas passageways and the surface tension of the liquid are also important factors, but they may be ignored for purposes of understanding this prior art design approach. When turn-down occurs, the main force contributing to liquid flow down through the gas passageways is only slightly effected. The magnitude of this force is proportional to and reflected by the clear liquid head or depth on the tray. In practice, the liquid is supported on the tray as a highly aerated froth. Since this froth has a density lower than an equivalent height of clear liquid (i.e., the process liquid without significant admixture with the process gas) an appropriate correction must be made to transform froth height to clear liquid height. The liquid or froth depth is primarily fixed by the height of the tray imperforate outlet weir at the tray discharge end. Thus, when turn-down takes place, the liquid or froth depth on a tray tends to remain fairly constant. As a result, as the column is turned-down, there is an increasing likelihood of liquid passing through the gas passageways thereby causing a reduction in tray stability. Accordingly, the tray is designed to have a high enough dry plate pressure drop at lower gas flows to ensure adequate tray stability at the lower gas flow rates for anticipated turn-down conditions.

One skilled in the art will readily appreciate that in order to ensure adequate stability at turn-down, this design procedure imposes a substantial pressure drop penalty at non turn-down design conditions. This penalty becomes especially severe in vacuum separation applications where a low pressure drop is extremely advantageous to avoid both excessive column diameters due to low overhead pressures and potential product degradation due to high base temperatures.

Another prior art approach to maintaining tray stability at turn-down has been to over-reflux the column so as to maintain the proper gas and liquid traffic within the column. However, this approach considerably increases the energy requirements per unit of product of the distillation system. Such increased energy requirements are undesirable due to high energy costs.

Yet another prior art approach to maintain tray stability at turn-down has been to blank off or obstruct a portion of the gas passageways of the gas-liquid contacting member of a sieve tray so as to reduce the flow area available for gas flow. This permits the dry plate pressure drop to be maintained at a satisfactory value to ensure adequate tray stability at the lower volumetric gas flow rates present when the column is operating in a turned-down condition. However, this is essentially a stop-gap approach which serves to increase costs since implementation requires extensive equipment modifications. Moreover, this approach is not a practical way to deal with daily variations.

OBJECT OF THE INVENTION

It is therefore an object of the present invention to provide an improved gas-liquid contacting tray for use in a gas-liquid contacting tower which will operate in a stable condition over a wide range of turn-down.

It is a further object of the present invention to provide a gas-liquid contacting tray for use in a gas-liquid contacting tower which will operate in a stable condition over a wide range of turn-down without requiring a tray design having an excessive dry plate pressure drop at design conditions.

It is yet a further object of the present invention to provide a gas-liquid contacting tray for use in a gas-liquid contacting tower which will operate in a stable condition over a wide range of turn-down and which has a structurally simple design.

Moreover, it is a further object of the present invention to provide a gas-liquid contacting tower containing gas-liquid contacting trays which will operate in a suitable condition over a wide range of turn-down.

These and other objects will be apparent from the following description and claims in conjunction with the drawings.

SUMMARY OF THE INVENTION

The present invention may be generally characterized as a gas-liquid contacting tray for use in a gas-liquid contacting tower for effecting intimate contact between rising gas and liquid flowing along a path on the surface of the tray across a gas-liquid contacting member of the tray from a liquid inlet region to a liquid discharge region;

said tray having a wall member contiguously associated with and extending the width of the discharge region oriented transverse to the path of liquid flow;

said wall member extending substantially vertically upwardly from the discharge region terminating in an upper edge thereby providing a frontal area facing the path of liquid flow for restricting discharge of the flowing liquid from the tray;

the improvement comprising:

the wall member having an aperture positioned below the wall member upper edge at a location selected to be below the surface of the flowing liquid over at least a major portion of the flow conditions of said contacting tray for discharging the flowing liquid.

As used herein, the term "gas" includes both normally gaseous as well as vaporous, normally liquid materials.

As used herein the term "liquid" includes aerated froth as is well understood in the gas-liquid contacting art.

DESCRIPTION OF THE PREFERRED EMBODIMENT

In order to afford a complete understanding of the present invention and an appreciation of its advantages, a description of the preferred embodiments is presented below.

Figure 1:
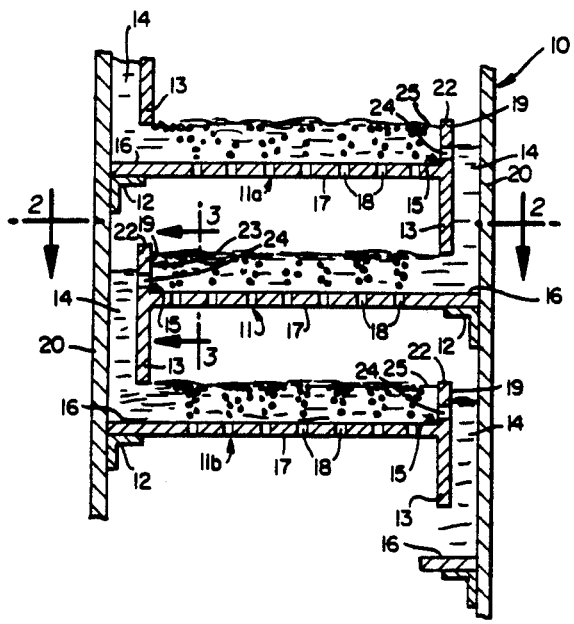
FIG. 1 is a schematic view in cross-sectional elevation of a portion of a gas-liquid contacting column having a gas-liquid contacting tray in accordance with the present invention.

Referring to FIG. 1, there is shown a portion of conventional gas-liquid contacting tower or column 10 comprising a cylindrical wall member 20 and having a plurality of substantially horizontally oriented perforated or sieve type gas-liquid contacting trays therein arranged one above the other. Three such trays 11, 11a, 11b are shown in their entirety. Each of the trays 11, 11a, 11b is supported and secured to the wall 20 of column 10 by tray holder 12. Additional tray support members (not shown) extending across the width of the column may be employed to prevent the tray from sagging in the center, if required by design considerations.

All the trays of column 10 will have the same general features of construction, and though the discussion hereinafter will be directed more specifically to tray 11, illustrated in plan in FIG. 2, it will be clear that it is equally applicable to the trays throughout the column.

Extending below the trays is a downcomer element 13 which in cooperation with the inner surface of wall 20 of column 10 forms a downcomer 14 for the passage of liquid downwardly from a tray liquid discharge region or end 15 to a tray imperforate liquid inlet region or receiving pan 16. The downwardly flowing liquid received on imperforate liquid inlet region or area 16 flows across the surface of the tray in a path across perforate gas-liquid contacting member 17, having a plurality of perforations 18, to tray discharge end or region 15 and is discharged from the tray into the next downcomer 14 for passage downwardly to the next lower tray imperforate liquid inlet area 16. A wall member 19, as will hereinafter be more fully described, is located at tray discharge region or end 15 for restricting discharge of liquid flowing across the surface of the tray into downcomer 14 for downward passage to the next lower tray.

A gas flows upwardly in column 10 through the perforations 18 of the gas-liquid contacting members 17 of the trays to effect intimate contact with the liquid flowing horizontally across the surface of a tray gas-liquid contacting member 17 in a manner well known in the art. Downcomer element 13 also functions as a baffle to seal the downcomers 14 from gas bypass in accordance with the practice of the art.

Wall member 19 is contiguously associated with and extends the width of the tray discharge end 15. That is, as illustrated in the embodiment of FIG. 2, the extreme lateral edges 21a, 21b of wall member 19 abut the walls 20 of tower 10. Wall member 19 extends substantially vertically upwardly from the surface of the tray at the discharge region or end 15 terminating in an upper edge 22. Accordingly, wall member 19 is oriented transverse to the path of liquid flow on the surface of tray 11 from liquid inlet area 16, across gas-liquid contacting member 17 to discharge end 15 for discharge into downcomer 14. Therefore, wall member 19 will restrict the discharge of a liquid flowing across a tray 11 into the downcomer 14 by providing a frontal area 23 facing the path of liquid flow across the tray. Stated otherwise, wall member 19 provides a damming effect for the liquid flowing across tray 11.

Figure 2:
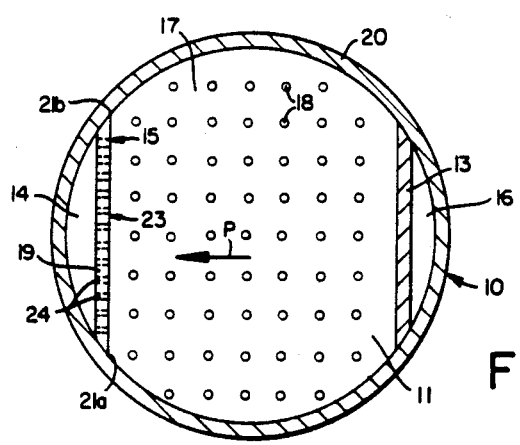
FIG. 2 is sectional view taken on line 2—2 of FIG. 1 providing an overhead plan view of a gas-liquid contacting tray in a gas-liquid contacting column in accordance with the present invention.

The path of liquid flow on the surface of a tray is illustrated by the arrow P in FIG. 2 for the purposes of the description herein to indicated the general direction a liquid will travel from its entrance on the tray liquid inlet region or area 16 to its exit at the tray discharge end 15. One skilled in the art is fully aware that the liquid on the surface of tray assumes complex localized flow patterns dependent on factors such as the geometries of the structure it encounters.

In accordance with the present invention, wall member 19 is provided with one or more apertures 24 positioned in wall member 19 below the upper edge 22 of wall member 19. In accordance with the present invention, aperture 24 is located below the surface 25 of the liquid flowing on the surface of the tray over at least a major portion of the design flow conditions of the tray. That is, the tray is designed so that one or more apertures 24 are positioned in wall member 19 below wall member upper edge 22 at a location so that apertures 24 are completely submerged below the flowing liquid surface 25 at tray discharge end 15 over at least a major portion of liquid flow operation of the tower or column.

In advantageous tray designs, apertures 24 will be positioned in wall member 19 so as to be completely submerged below flowing liquid surface 25 over about 70 percent of the design flow conditions. In some instances, the apertures 24 will be positioned in wall member 19 to be completely submerged below the flowing liquid surface 25 during all steady state flow conditions.

Accordingly, one or more apertures 24 discharge a liquid flowing across a tray into downcomer 14. The liquid discharged by aperture 24 into downcomer 14 accordingly flows under upper edge 22 of wall member 19. Therefore, this discharged liquid may be said to underflow the upper edge 22 of wall member 19.

The present invention is contemplated as being practiced with the liquid flowing across the surface of the tray being discharged both over the upper edge 22 of wall member 19 and through submerged apertures 24 into downcomer 14 at full design flow and possibly at minimum turn-down conditions. That is, surface 25 of the flowing liquid would be above the upper edge 22 of wall member 19 during steady state conditions of full design flow and possibly at minimum turn-down but a portion of the flowing liquid discharged from tray 11 into downcomer 14 is underflowed below wall member upper edge 22 through submerged apertures 24 into downcomer 14. At flow conditions approaching maximum turndown, the surface 25 of the flowing liquid would be below the upper edge 22 of wall member 19 with apertures 24 remaining submerged below the flowing liquid surface 25 over at least a major portion of the flow conditions approaching maximum turn-down.

In an alternate practice of the present invention, the wall member 19 will extend vertically upwardly from the surface of a tray 11 to an extent that the upper edge 22 is above the surface 25 of the flowing liquid at the tray discharge region 15 during steady state flow operating conditions both at full design flow and all conditions of turn-down. Thus, in this alternate practice, all the liquid flowing across a tray and discharged into downcomer 14 is discharged through submerged apertures 24. Liquid will not flow over the wall member upper edge 22 for discharge into downcomer 14. All the liquid discharged from tray 11 into downcomer 14 is underflowed below wall member upper edge 22 through submerged aperture 24 into downcomer 14.

It should be noted that the upper edge 22 of wall member 19 is not illustrated as extending completely to the next higher contacting tray in the tower so as to completely block the gas space above the tray from the downcomer 14. This is necessary to provide for venting of entrained gas released from the liquid which has been discharged into the downcomer. If the wall member 19 extended to the next higher contacting tray, appropriate gas ports through the wall member would have to be provided.

The present invention results in the height of a liquid flowing across a gas-liquid contacting tray being more directly proportional to the flow rate of a liquid across the surface of the tray. The greater the flow rate, the higher will be the height (i.e., the deeper the depth) of the liquid or froth flowing across the tray. The lesser the flow rate, the lower will be the height (i.e., the shallower the depth) of the liquid of froth flowing across the tray. Accordingly, the present invention will cause the height of a liquid flowing across a gas-liquid contacting tray to decrease in proportion to the degree of turn-down. The term proportion is not being used in a strict mathematical sense but indicates a trend of relationship hereinafter illustrated in the example which will clearly impart the significance of the present invention to one skilled in the art in conjunction with the description herein.

That is, at turn-down, the gas flow rate and liquid flow rate in the column are reduced. Since gas flow rate decreases, the dry plate pressure drop decreases. Thus, the resistance to liquid flow through the perforations 18 of tray perforate gas-liquid contacting member 17 decreases. The discharge end wall member 19, in accordance with the present invention, results in a decrease in the height of the liquid or froth flowing across the surface of the tray when the liquid flow rate is decreased. Thus, the present invention reduces the main force causing weeping or dumping (flow of liquid through perforations 18) when the resistance to weeping and dumping decreases.

Accordingly, the present invention permits a gas-liquid contacting tray to be designed to operate near the minimum stability or the minimum dry plate pressure drop necessary to prevent or at least minimize weeping at design conditions. By design conditions is meant the design 100 percent liquid flow and gas flow tray loading. Thus, in accordance with the present invention, it is no longer necessary to design a gas-liquid contacting tray for a high stability (i.e., a high dry plate pressure drop) at design flows in order to insure adequate stability at turn-down.

Furthermore, by maintaining wall member 19 upper edge 22 above the level of liquid flowing on a tray, the wall member 19, in accordance with the present invention, also functions as a baffle preventing liquid from splashing from a tray into the downcomer. That is, liquid droplets which splash toward the downcomer are deflected by the upper portion of wall member 19 and are returned to the liquid on the tray. This is advantageous in that splashing of liquid from the tray into the downcomer tends to reduce gas-liquid contact time on the tray and thus tends to decrease mass transfer efficiency. This is an especially severe problem in cases where the column is lightly liquid loaded.

Various suitable embodiments of wall member 19 located at tray discharge end or region 15 in accordance with the present invention are illustrated in FIGS. 3 to 6.

Figure 3:
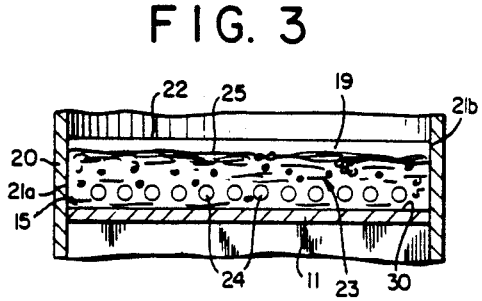
FIG. 3 is a view taken on line 3—3 of FIG. 1 providing an elevation view of an embodiment of a gas-liquid contacting tray discharge end wall member in accordance with the present invention.

In FIG. 3, wall member 19 is provided with a row of a plurality of substantially equally sized apertures or orifices 24 substantially uniformly spaced across the width of wall member 19. The lower edge 30 of wall member 19 is contiguous with the tray 11 at its discharge end 15. The apertures 24 are positioned near the wall member lower edge 30. In accordance with the present invention, apertures or orifices 24 are positioned in wall member 19 below the upper edge 22 at a location selected to be below the surface 25 of the flowing liquid over at least a major portion of the flow operating conditions. The wall member upper edge 22 is illustrated in FIG. 3 as being above the surface 25 of the flowing liquid during steady state flow conditions thereby preventing flow of the liquid over upper edge 22.

Figure 4:
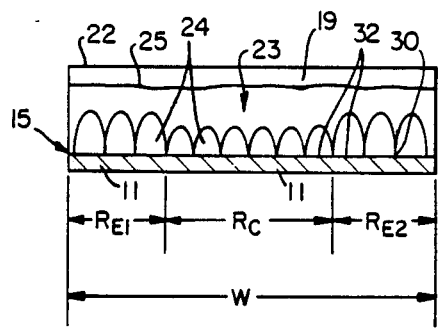
FIGS. 4 and 5 are elevation views of additional embodiments of gas-liquid contacting tray discharge end wall members for use with a gas-liquid contacting tray such as illustrated in FIGS. 1 and 2 in accordance with the present invention.

FIG. 4 illustrates another embodiment of wall member 19 in accordance with the present invention. The apertures 24 below wall member upper edge 22 are provided by a series or row of arches or notches in the lower portion of the wall member. Apertures 24 are formed when the lower edge 30 of wall member 19 is made contiguous or contiguously joined with the surface of tray 11 at the tray discharge region 15. Accordingly, the lower extremity 32 of the apertures 24 may be said to be flush with the surface of tray 11 at discharge region 15.

In the particular embodiment illustrated in FIG. 4, apertures 24 are equally spaced but not equally sized. The total area of the plurality of apertures 24 is thus non uniformly distributed. The wall member 19 may be said to be apportioned along its longitudinal or transverse width W into a center region $R_c$ and two extremity regions $R_{E1}$ and $R_{E2}$. That is, extremity regions $R_{E1}$ and $R_{E2}$ are transversely adjacent each side of center region $R_c$. The total flow area of the plurality of apertures is thus apportioned so that the combined aperture flow area in extremity regions $R_{E1}$ and $R_{E2}$ is significantly greater than the aperture flow area in center region $R_c$. It will be apparent that such an apportionment could be achieved by using a variable spacing of a plurality equally sized apertures or by some combination of variable sizing and variable spacing. Wall members of this embodiment may be advantageous for circular edged, single pass crossflow sieve trays, since the design of this embodiment helps improve liquid flow patterns across such trays.

Representative values for such an apportionment would be: Center region $R_c$ is suitably about 25 percent to 50 percent the total wall member surface area. Therefore, the combined area of extremity regions $R_{E1}$ and $R_{E2}$ is suitably about 50 percent to 75 percent the total wall member surface area with the area of extremity region $R_{E1}$ being substantially equal to the area of extremity region $R_{E2}$. The combined flow area of the apertures 24 positioned in extremity regions $R_{E1}$ and $R_{E2}$ is suitably about 50 percent to 75 percent the total flow area of all of the plurality of apertures located in wall member 19 with the sum of the flow areas of the apertures located in extremity region $R_{E1}$ being substantially equal to the sum of the flow areas of the apertures located in extremity region $R_{E2}$.

Figure 5:
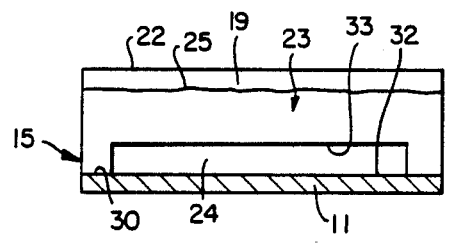

FIG. 5 illustrates an embodiment of tray discharge end wall member 19 having a single aperture 24. A single notch in the lower portion of wall member 19 forms single aperture 24 having a slot-like shape when the lower edge 30 of wall member 19 is made contiguous with the surface of tray 11 at the tray discharge region 15. Hence the lower extremity 32 of slot-like aperture 24 is flush with the surface of tray 11 at discharge end 15. The upper extremity 33 of slot-like aperture 24 is below wall member upper edge 22 at a location selected to be below the surface 25 of the flowing liquid at tray discharge end 15 over at least a major portion of the flow conditions.

As hereinbefore described, wall member 19 provides a frontal area 23 (FIG. 1) facing the path of liquid flow across a tray. The frontal area is defined by a vertical plane bound on the bottom by the surface of a tray discharge region or end 15; bounded on the sides by the extreme lateral edges 21a, 21b of wall member 19 and bounded on the top by wall member upper edge 22. If wall member 19 does not have a planer vertical surface facing the path of fluid flow, the frontal area would be the projections of the described physical boundries on the described vertical plane.

In most commonly encountered distillation designs, the total flow area provided by the apertures 24 positioned in wall member 19 in accordance with the present invention should be about 5 percent to 50 percent the frontal area of the wall member facing the path of liquid flow across the surface of a tray where the height of the wall member is approximately equal to the desired froth height at maximum flow conditions. If the total flow area is below about 5 percent, then the desired variation between the liquid flow rate across the gas-liquid contacting tray and the height of the liquid on the tray is substantially impaired. Instead, the liquid depth will remain essentially constant as the liquid flow is varied and the tray discharge end wall member would tend to perform similarly to conventional imperforate outlet weirs. If the total flow area is increased above about 50 percent then the damming effect of the tray discharge end wall member is significantly impaired. Once again the liquid depth remains essentially constant as the liquid flow rate is varied. In this instance, however, the liquid depth remains constant at a much lower than desired height. This significantly impairs overall mass transfer efficiency since the lower than desired liquid depth causes a reduction in the gas-liquid contact time on the contacting tray.

The preferred total flow area provided by the apertures 24 positioned in wall member 19 in accordance with the present invention is about 10 percent to 25 of the frontal area of the wall member. Best performance is typically achieved in this range. For a particular design requirement, the optimum aperture total flow area in accordance with the present invention may best be determined for that particular design by experimental trial and error.

EXAMPLE

To more fully illustrate the present invention, the following example is set forth.

A test tray having a rectangular geometry was employed. The tray flow path length was 25.75 inches (65.4 cm.). The width of the tray flow path was about 20 inches (50.8 cm.). The tray gas-liquid contacting member was provided with a plurality of substantially uniformly distributed circular gas passages each 0.187 inch (0.475 cm.) in diameter yielding a total open area of 53 square inches (342 sq.cm.). Accordingly, about 10 percent of the tray gas-liquid contacting area comprised perforations. For this particular test tray, tray loading at design conditions (100% tray loading) is a liquid loading of 0.167 CFS (4.7 liters/sec.) and a gas loading of 20.6 ACFS (0.58 ACMS).

Figure 6:
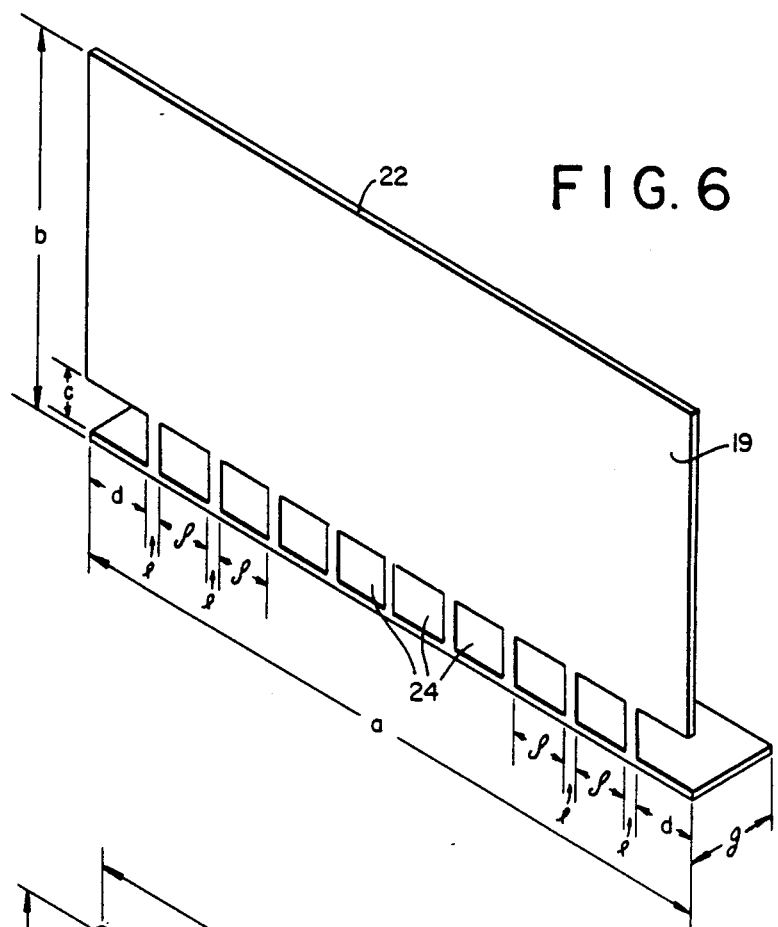
FIG. 6 is a perspective view of another embodiment of a gas-liquid contacting tray discharge end wall member for use with a gas-liquid contacting tray in accordance with the present invention.

Tests were conducted by providing the test tray with an outlet wall member, in accordance with the present invention, as illustrated in FIG. 6, by attaching the wall member to the liquid discharge end of the tray transverse to the liquid flow path across the tray. Tests were also conducted by similarly providing the test tray with a conventional prior art outlet wall member or weir illustrated in FIG. 7.

The test tray discharge end wall member in accordance with the present invention had the following dimensions as illustrated in FIG. 6.

a = 20 inches (50.8 cm.)
b = 6.375 inches (16.2 cm.)
c = 1.0 inches (2.54 cm.)
d = 1.875 inches (4.76 cm.)
e = 0.25 inches (0.64 cm.)
f = 1.75 inches (4.45 cm.)
g = 1.5 inches (3.81 cm.)

The test tray discharge ene wall member, in accordance with the present invention, as illustrated in FIG. 6, is provided with 10 apertures. The apertures at the two extreme ends each have a flow area of 1.875 sq. in. The eight interior apertures each have a flow area of 1.75 sq. in. The apertures are equally spaced across the wall member and were positioned so as to be substantially flush with the surface of the tray. The vertical extent of the test discharge end wall member in accordance with the present invention (6.375 inches) was selected so that the upper edge of the wall member would be above the surface of the liquid flowing on the surface of the tray for the liquid flow rates used in the tests. The total flow area of the liquid flow apertures of the test discharge end wall member is about 14 percent of the frontal area of the test wall member. The dimensions of the test discharge end wall member, in accordance with the embodiment of the present invention as illustrated in FIG. 6, were selected on the basis of preliminary theoretical calculates and brief experimentation with a similar wall member having discharge apertures with adjustable flow areas.

Figure 7:
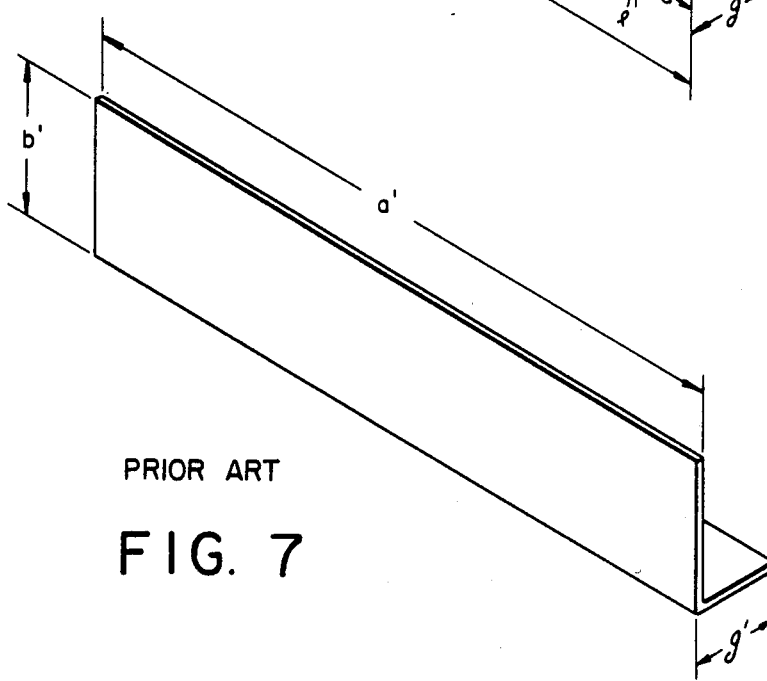
FIG. 7 is a perspective view of a prior art gas-liquid contacting tray outlet weir.

Comparative tests were conducted with the conventional outlet wall member or outlet weir having the following dimensions illustrated in FIG. 7:

a' = 20 inches (50.8 cm.)
b' = 2 inches (5.08 cm.)
g' = 1.5 inches (3.81 cm.)

Tests were conducted to determined overall tray pressure drop as a function of tray loading (gas loading and liquid loading) for the test tray fitted with the hereinbefore described discharge end wall member in accordance with the present invention and with the hereinbefore described conventional outlet wier. Tray pressure drops for various liquid and gas loadings are recorded in Table I for the tray having a discharge end wall member in accordance with the present invention and in Table II for the tray having an outlet weir representative of the prior art.

TABLE I (Present Invention)

| Tray Loading % Design Condition | Liquid Loading CFS | Gas Loading ACFS | Pressure Drop in. of H$_2$O |
|---|---|---|---|
| 120 | 0.200 | 24.7 | 3.40 |
| 110 | 0.184 | 22.7 | 3.15 |
| 100 | 0.167 | 20.6 | 2.88 |
| 90 | 0.150 | 18.5 | 2.66 |
| 80 | 0.134 | 16.5 | 2.31 |
| 70 | 0.117 | 14.4 | 1.96 |
| 60 | 0.100 | 12.4 | 1.60 |
| 50 | 0.084 | 10.3 | 1.21 |
| 40 | 0.067 | 8.24 | 0.97 |
| 30 | 0.050 | 6.18 | 0.79 |

TABLE II (Prior Art)

| Tray Loading % Design Condition | Liquid Loading CFS | Gas Loading ACFS | Pressure Drop in. of H$_2$O |
|---|---|---|---|
| 120 | 0.200 | 24.7 | 3.30 |
| 110 | 0.184 | 22.7 | 3.03 |
| 100 | 0.167 | 20.6 | 2.82 |
| 90 | 0.150 | 18.5 | 2.60 |
| 80 | 0.134 | 16.5 | 2.38 |
| 70 | 0.117 | 14.4 | 2.22 |
| 60 | 0.100 | 12.4 | 2.08 |
| 50 | 0.084 | 10.3 | 1.94 |
| 40 | 0.067 | 8.24 | 1.79 |
| 30 | 0.050 | 6.18 | 1.3-1.4 |

Figure 8:
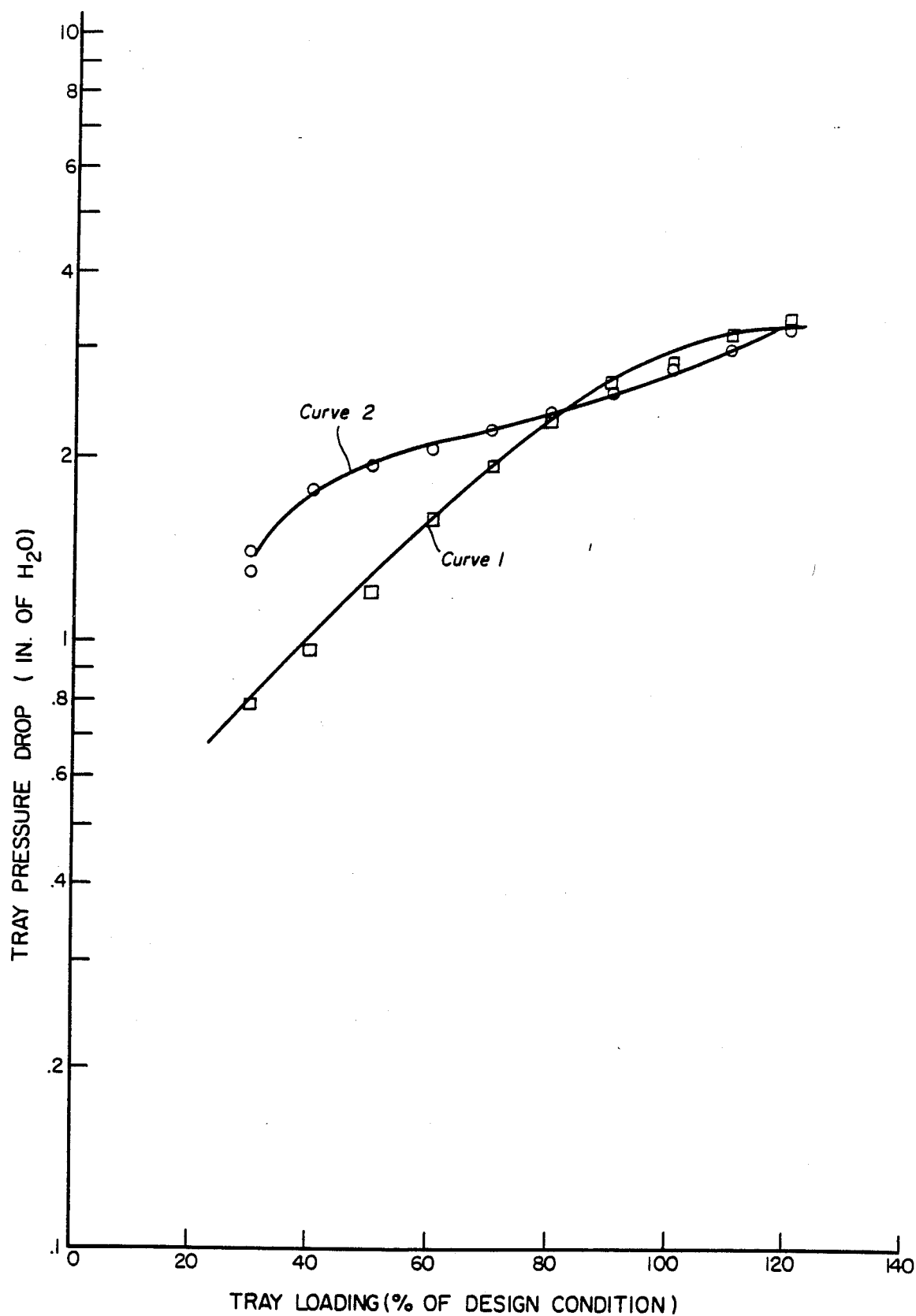
FIG. 8 is a graph showing the improvement in overall tray pressure drop as a function of tray loading for a gas-liquid contacting tray having an outlet wall member of the particular embodiment illustrated in FIG. 6 in accordance with the present invention.

The values of Tray Pressure Drop (inches of H$_2$O) as a function of Tray Loading expressed as percent of Design Condition from Table I and Table II were plotted conventionally on a semi-logarithmic scale as illustrated in FIG. 8. Curve 1 presents the values of Table I in accordance with the present invention. Curve 2 represents the values of Table II (The Prior Art).

Referring to FIG. 8, curve 2 (the prior art) illustrates that as the tray fitted with a conventional imperforate outlet weir is turned-down, the total tray pressure drop decreases very gradually. Specifically, as the gas and liquid loading is turned-down to 30% of design loading (i.e., 70% turn-down), the total tray pressure drop decreases 52.1% relative to the pressure drop at design loading. As well-recognized by one of ordinary skill in the gas-liquid contacting art, the total pressure drop for gas flow through a contacting tray can be considered as two resistances in series: the dry plate pressure drop, and the pressure drop due to the hydrostatic head of the aerated froth on the tray. Since the hydrostatic head of the aerated froth on the tray fitted with the conventional outlet weir is essentially fixed by the weir, the decrease in the total tray pressure drop is primarily attributable to the decrease in the dry plate pressure drop accompanying the reduced gas flow at turn-down.

Referring to FIG. 8, curve 1 (present invention) illustrates that as the tray fitted with the discharge end wall member in accordance with the present invention is turned-down, the total tray pressure drop decreases much more rapidly relative to curve 2. Specifically, as the gas and liquid loading is turned-down to 30% of design loading (i.e. 70% turn-down), the total tray pressure drop decreases by 72.6% relative to the pressure drop at the design loading. Since the dry plate pressure drop has decreased the same in both cases, the greater reduction in total tray pressure drop of curve 1 (the present invention) relative to curve 2 (the prior art) must be due to a greater reduction in the hydrostatic head of the aerated froth flowing on the surface of the tray.

Accordingly, this example demonstrates the greater variation of liquid height with respect to liquid flow on a gas-liquid contacting tray fitted with an outlet wall member in accordance with the present invention.

Visual observations of the tests confirmed the decrease of the liquid froth height with turn-down for the gas-liquid contacting tray fitted with the discharge region wall member in accordance with the present invention. Moreover, it was observed that the amount of liquid weeping and the degree of gas-liquid maldistribution was significantly improved for the tray fitted with a discharge region wall member in accordance with the present invention relative to the same tray using a convention imperforate outlet weir.

Even though the total tray pressure drop at turn-down of a test tray fitted with a discharge region wall member in accordance with the present invention is lower than the total tray pressure drop of the test tray fitted with a prior art outlet weir, the present invention nevertheless results in decreased weeping because the dry plate pressure drop comprises a larger portion of the overall pressure drop. Accordingly, the tray stability, which is proportional to the ratio of the dry plate pressure drop to the hydrostatic head, can be higher at turn-down on a tray employing the discharge region wall member in accordance with the present invention.

Moreover, since the total tray pressure drop of a test tray fitted with a discharge region wall member in accordance with the present invention varies approximately directly with the degree of turn-down, a gas-liquid contacting tray may be designed with a decreased dry plate pressure drop at design conditions and still provide for stable tray performance over wide ranges of turn-down since the stability factor remains relatively constant.

The improved results in accordance with the present invention is believed attributable to the following factors. In sieve tray design, the dry plate pressure drop is normally proportional to the square of the gas flow rate, i.e. the gas loading. Use of the discharge end wall member having one or more apertures below the upper edge of the wall member and below the surface of the liquid flowing on the surface of the tray, in accordance with the present invention, transforms the liquid height to liquid flow functionality from an approximate half order relationship characteristic of weir flow to an approximate second order relationship according to the well known orifice equation. Thus, the tray stability, which as hereinbefore discussed is proportional to the ratio of the dry plate pressure drop and the hydrostatic head, becomes substantially independent of the degree of turn-down.

Figure 9:
FIG. 9 is an elevation view of another prior art gas-liquid contacting tray outlet weir.

Prior art outlet weirs of the type illustrated in FIG. 7 and FIG. 9 do not achieve a liquid height to liquid flow functionality approximating a second order relationship. Thus, although a prior art castellated-type outlet wier illustrated in FIG. 9 provides improved sieve tray operation at equivalent degrees of turn-down in comparison with the prior art outlet weir of FIG. 7 by reducing the rate of change by which tray stability varies with turn-down, the present invention provides superior performance in comparison with either type prior art outlet weir.

The foregoing is given by way of a possible explanation of the operation of the present invention but is not intended to limit the present invention as defined in the claims to any particular theory of operation.

Although the present invention has been described in conjunction with a sieve type gas-liquid contacting tray, it will be recognized by one skilled in the art that it is readily adaptable for use with other types of gas liquid contacting trays such as bubble cap or valve trays. Likewise, it will be readily apparent to one skilled in the art that the present invention may be employed with all configurations of gas-liquid contacting trays such as single pass crossflow, double pass crossflow, parallel flow and multipass flow (e.g., multiple downcomer) trays.

Although preferred embodiments of the present invention have been described in detail, it is contemplated that modifications may be made and that some features may be employed without others, all within the spirit and scope of the invention.

What is claimed is:

1. In a gas-liquid contacting tray for use in a gas-liquid contacting tower for effecting intimate contact between rising gas and liquid flowing along a path on the surface of said tray across a gas-liquid contacting member of said tray from a liquid inlet region to a liquid discharge region;

said tray having a wall member continuously associated with the extending the width of said discharge region oriented transverse to said path of liquid flow;

said wall member extending substantially vertically upwardly from said discharge region terminating in an upper edge thereby providing a frontal area facing said path of fluid flow for restricting discharge of said flowing liquid from said tray;

the improvement which consists essentially of:

said wall member having an aperture positioned below said wall member upper edge at a location to be completely submerged below the surface of said flowing liquid over at least a major portion of the flow conditions of said contacting tray for discharging said flowing liquid, said wall member having no aperture(s) positioned at said upper edge and no aperture(s) positioned at a location such as not to be completely submerged below the surface of said flowing liquid over at least a major portion of the flow conditions of said contacting tray for discharging and flowing liquid.

2. An apparatus as recited in claim 1 wherein said wall member upper edge is above the surface of said flowing liquid thereby preventing flow of said liquid under full design flow conditions, over said upper edge.

3. An apparatus as recited in claim 1 wherein said aperture has an area of about 5 percent to 50 percent said frontal area of said wall member.

4. An apparatus as recited in claim 3 wherein said aperture area is about 10 percent to 25 percent said frontal area.

5. An apparatus as recited in claim 1 wherein said aperture comprises a row of a plurality of aperture spaced across the width of said wall member having a total area of about 5 percent to 50 percent said frontal area of said wall member.

6. An apparatus as recited in claim 1 wherein said aperture comprises a row of a plurality of apertures spaced across the width of said wall member having a total area of about 10 percent to 25 percent said frontal are of said wall member.

7. An apparatus as recited in claim 5 wherein said apertures are uniformly spaced across the width of said wall member and the area of each of said plural apertures is equal.

8. An apparatus as recited in claim 6 wherein said apertures are uniformly spaced across the width of said wall member and the area of each of said plural apertures is equal.

9. An apparatus as recited in claim 7 wherein each of said plural apertures has a bottom flush with the surface of said tray.

10. An apparatus as recited in claim 8 wherein each of said plural apertures has a bottom flush with the surface of said tray.

11. An apparatus as recited in claim 5 wherein said wall member has a center region and an extremity region transversely adjacent each side of said center region and wherein the total area of said plural apertures is non uniformly apportioned among said plural apertures with the total area of apertures located in said extremity regions being about 50 percent to 75 percent said total area of said plural apertures.

12. An apparatus as recited in claim 6 wherein said wall member has a center region and an extremity region transversely adjacent each side of said center region and wherein the total area of said plural apertures is non uniformly apportioned among said plural apertures with the total area of apertures located in said extremity regions being about 50 percent to 75 percent said total area of said plural apertures.

13. An apparatus as recited in claim 11 wherein each of said plural apertures has a bottom flush with the surface of said tray.

14. An apparatus as recited in claim 12 wherein each of said plural apertures has a bottom flush with the surface of said tray.

15. An apparatus as recited in claim 3 wherein said aperture is a single aperture having a slot-like shape.

16. An apparatus as recited in claim 4 wherein said aperture is a single aperture having a slot-like shape.

17. An apparatus as recited in claim 1 wherein said aperture is positioned at a location selected to be below the surface of said flowing liquid during all steady state flow conditions.

18. An apparatus as recited in claim 1 wherein the surface of said flowing liquid is above the wall member upper edge under full design flow conditions.

19. An apparatus as recited in claim 1 in which said major portion of the flow conditions includes turndown to about 30% of full design flow conditions.

* * * * *